UNITED STATES PATENT OFFICE.

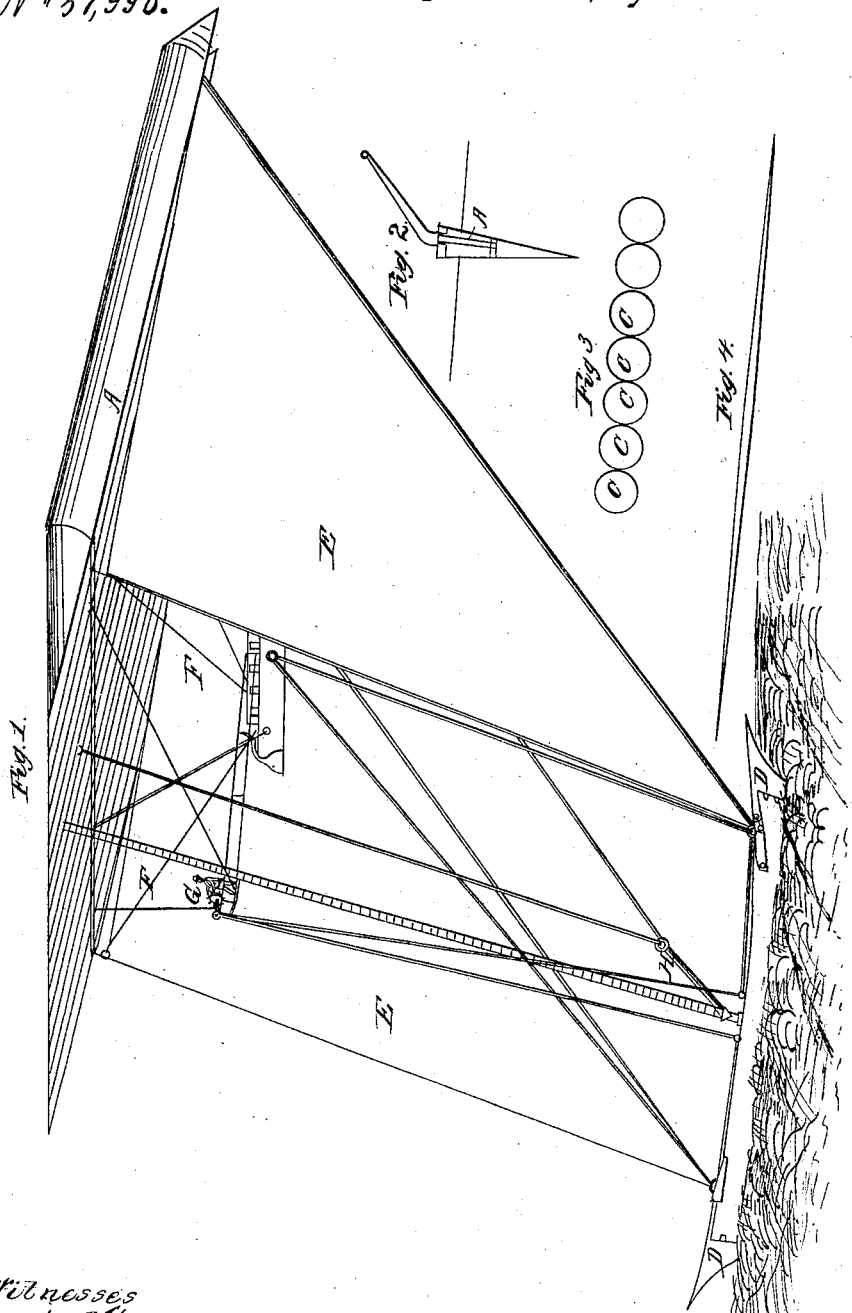

CHESTER W. SYKES, OF SUFFIELD, CONNECTICUT.

IMPROVEMENT IN MARINE BALLOONS.

Specification forming part of Letters Patent No. 57,996, dated September 11, 1866.

*To all whom it may concern:*

Be it known that I, CHESTER W. SYKES, of Suffield, Hartford county, Connecticut, have invented a new and Improved Mode of Traveling Upon Water; and I do hereby declare the following is a full and exact description thereof, reference being had to the accompanying drawings, and to the letters of reference marked thereon.

The nature of my invention consists in making a balloon in a broad thin form, so as to present to the wind a surface which shall have the least possible resistance to it, which will exert a bouyant tendency upon the balloon when held before the wind similar to a kite; also, in having a guide in the water, with movable sails between it and the balloon, to be adjusted so as to act in conformity with each other to move the balloon in the direction desired.

To enable others skilled in the art to make and use my invention, I will proceed to describe its construction and operation.

I make my balloon in compartments or sections, each of which is made in a long tubular form, conical at each end, as represented in Figure 1, letter *a*. I place them side by side, as seen at letters *c c*, Fig. 3, and hold them in position by any method most desirable, to which must be attached the riding-car, sails, stays, guide, &c., in the most desirable manner, as partially represented in Fig. 1.

The reasons for making the balloon as described above are that it may be held before the wind in the position of a kite and that the tubes may be made of very thin metal or other desirable material without injuring the texture of it, and make a perfectly tight reservoir for the gas; also, in case of leakage, that it should not effect the other sections, thereby avoiding the great waste of gas and unmanageable shape of common balloons for traveling purposes.

D D D, Fig. 1, represents a side view of the guide with rudders at each end, (colored red.) Fig. 2 represents a sectional view across the middle of the guide, with a movable crane, H A, to which are attached main stays running to the balloon to keep the guide in an upright position. Fig. 4 represents a deck view of the guide.

The reasons for making it as described above are that it shall offer the least possible resistance, while passing through the water, to the speed of the balloon.

E E, Fig. 1, represents the sail, (colored white,) which may be stationary at the bottom, but movable in its upper fastenings, that it may be set to the wind in such a manner as to move the balloon in the direction desired.

G, Fig. 1, represents a man at the wheel for the direction of the rudders.

What I claim, and desire to secure by Letters Patent, is—

A broad flat balloon of tubular or sectional formation, to be held before the wind similar to a kite, in combination with sails and guide, substantially as before described.

CHESTER W. SYKES.

Witnesses:
J. B. GARDINER,
J. E. FULLER.